United States Patent
Lin (10) Patent No.: US 12,112,176 B1
(45) Date of Patent: Oct. 8, 2024

(54) SELECTIVE FIRMWARE PLACEMENT DURING INITIALIZATION OF COMPUTE SYSTEMS

(71) Applicant: Quanta Computer Inc., Taoyuan (TW)

(72) Inventor: Yu-Han Lin, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 43 days.

(21) Appl. No.: 18/184,518

(22) Filed: Mar. 15, 2023

(51) Int. Cl.
 *G06F 9/44* (2018.01)
 *G06F 9/4401* (2018.01)
(52) U.S. Cl.
 CPC .................. *G06F 9/4403* (2013.01)
(58) Field of Classification Search
 CPC .................. G06F 1/32; G06F 9/44; G06F 1/12
 See application file for complete search history.

(56) References Cited

U.S. PATENT DOCUMENTS

| | | | |
|---|---|---|---|
| 11,222,120 B2 | 1/2022 | Lip Vui et al. | |
| 2015/0378747 A1* | 12/2015 | Mudusuru | G06F 9/4401 713/2 |
| 2018/0285260 A1* | 10/2018 | Lu | G06F 12/0891 |

FOREIGN PATENT DOCUMENTS

| | | |
|---|---|---|
| TW | 201530315 A | 8/2015 |
| TW | 202125233 A | 7/2021 |

OTHER PUBLICATIONS

TW Office Action for Application No. 112132096 mailed Jun. 13, 2024, w/ First Office Action Summary, 6 pp.
TW Search Report for Application No. 112132096 mailed Jun. 13, 2024 w/ First Office Action, 1 p.

* cited by examiner

*Primary Examiner* — Keshab R Pandey
(74) *Attorney, Agent, or Firm* — NIXON PEABODY LLP (57) ABSTRACT

An example computer-implemented method is for initializing a compute system. The computer-implemented method includes causing a cache to be initialized in a central processing unit (CPU) of the compute system in response to basic input/output system (BIOS) code being executed directly from flash memory. Moreover, a communication path is initialized, the communication path extending between the CPU and memory corresponding to a baseboard management controller (BMC) of the compute system. BIOS firmware is copied from the BMC memory to the CPU cache, and the BIOS firmware is initiated from the CPU cache. The computer-implemented method includes causing a memory controller of the CPU to be initialized, in addition to causing a portion of the BIOS firmware to be copied from the CPU cache to memory corresponding to the CPU. Furthermore, a portion of the BIOS firmware is initiated from the CPU memory.

20 Claims, 4 Drawing Sheets

SELECTIVE FIRMWARE PLACEMENT DURING INITIALIZATION OF COMPUTE SYSTEMS

TECHNICAL FIELD

The present invention relates to data storage systems, and more particularly, to the process of initializing compute systems.

BACKGROUND

Computational devices are often complex systems that are run by operating systems. These operating systems include software that supports basic functions of the computational devices, e.g., such as scheduling tasks and executing applications. However, before an operating system is able to interact with a computational device upon being powered on, some preliminary steps must first be made. For instance, the various components included in a computational device are first inspected to make sure they have been initialized and are operational. This helps prevent situations where the operating system is loaded, only to determine that a critical error is preventing the computational device from functioning properly.

While performing these preliminary steps helps ensure computational devices are able to function properly upon being powered on, conventional products have suffered from inefficiencies caused by these preliminary steps. For example, the types of preliminary steps and how they are performed undesirably causes significant amounts of latency during startup. These conventional products also place a significant amount of strain on the physical components in a computational device. Over time, this strain causes components to fail prematurely, thereby leading to further inefficiencies and system downtime to perform repairs and/or replacements.

As a result, conventional products have suffered significant inefficiencies resulting from the startup process of computational devices. Moreover, these inefficiencies have been unresolved. Thus, there is a need for methods, computer program products, and systems that are able to improve the process of managing compute systems during startup. Moreover, these improvements must be achieved without negatively affecting performance of the systems.

SUMMARY

The term embodiment and like terms, e.g., implementation, configuration, aspect, example, approach, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

It should also be noted that while various embodiments herein are described in the context of flash memory, this is in no way intended to be limiting. Embodiments herein may be implemented in systems having any desired type of random access, non-volatile memory that would benefit from the various achievements herein, e.g., as would be appreciated by one skilled after reading the present description.

An example computer-implemented method is for initializing a compute system. The computer-implemented method includes causing a cache to be initialized in a central processing unit (CPU) of the compute system in response to basic input/output system (BIOS) code being executed directly from flash memory. Moreover, a communication path is initialized, the communication path extending between the CPU and memory corresponding to a baseboard management controller (BMC) of the compute system. BIOS firmware is copied from the BMC memory to the CPU cache, and the BIOS firmware is initiated from the CPU cache. The computer-implemented method includes causing a memory controller of the CPU to be initialized, in addition to causing a portion of the BIOS firmware to be copied from the CPU cache to memory corresponding to the CPU. Furthermore, a portion of the BIOS firmware is initiated from the CPU memory.

In some implementations, causing the BIOS firmware to be initiated from the CPU cache includes calling to a pre-Extensible Firmware Interface (EFI) initialization (PEI) entry point in the BIOS firmware in the CPU cache, thereby initiating a PEI phase of initializing the compute system. In other implementations, the computer-implemented method further includes calling to PEI modules (PEIMs) in the CPU cache and using the PEIMs to initialize the memory controller of the CPU.

In some implementations, the CPU memory includes random access memory (RAM) and/or the BMC memory includes RAM. In other implementations, the communication path extends between the CPU and a shared portion of the BMC memory, the shared portion of the BMC memory being accessible to the CPU and the BMC.

In some implementations, the computer-implemented method further includes calling to PEIMs in the CPU memory, causing BIOS firmware to be copied from the BMC memory to the CPU memory, and causing the BIOS firmware to be initiated from the CPU memory.

In some implementations, the BIOS firmware copied from the BMC memory to the CPU memory includes driver execution environment (DXE) foundation code. Moreover, causing the BIOS firmware to be initiated from the CPU memory includes calling to a DXE entry point in the DXE foundation code, thereby initiating a DXE phase of initializing the compute system in some implementations. In still further implementations, the flash memory includes serial peripheral interface NOR flash memory.

An example computer program product is for initializing a compute system. The computer program product includes a computer readable storage medium having program instructions embodied therewith. Moreover, the program instructions are readable and/or executable by a processor to cause the processor to perform the foregoing method.

An example compute system includes flash memory, a CPU, and a BMC. The system further includes a processor, and logic integrated with and/or executable by the processor. Moreover, the logic is configured to: perform the foregoing method.

The above summary is not intended to represent each embodiment or every aspect of the present disclosure.

Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

DETAILED DESCRIPTION

The present disclosure is directed toward a computer-implemented method for initializing a compute system. The computer-implemented method includes causing a cache to be initialized in a CPU of the compute system in response to BIOS code being executed directly from flash memory. Moreover, a communication path is initialized, the communication path extending between the CPU and memory corresponding to a BMC of the compute system. BIOS firmware is copied from the BMC memory to the CPU cache, and the BIOS firmware is initiated from the CPU cache. The computer-implemented method includes causing a memory controller of the CPU to be initialized, in addition to causing a portion of the BIOS firmware to be copied from the CPU cache to memory corresponding to the CPU. Furthermore, a portion of the BIOS firmware is initiated from the CPU memory.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical", "horizontal", "parallel", and "perpendicular" are intended to additionally include "within 3-5% of" a vertical, horizontal, parallel, or perpendicular orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

As previously mentioned, computational systems are often complex and expensive, making failures experienced by these systems a significant issue. Thus, before an operating system is able to interact with a computational device upon being powered on, some preliminary steps are first performed. For instance, the various components included in a computational device are first inspected to make sure they have been initialized and are operational. This helps prevent situations where the operating system is loaded, only to determine that a critical error is preventing the computational device from functioning properly.

While performing these preliminary steps helps ensure computational devices are able to function properly upon being powered on, conventional products have suffered from inefficiencies resulting from these preliminary steps. For example, the types of preliminary steps and how they are performed undesirably causes significant amounts of latency during startup in conventional products. These conventional products also place a significant amount of strain on the physical components in computational devices. Over time, this strain causes components to fail prematurely, thereby leading to further inefficiencies and system downtime to perform repairs and/or replacements.

In sharp contrast to these conventional shortcomings, implementations included herein are able to successfully and efficiently manage compute systems during startup. Moreover, these improvements are achieved without negatively affecting performance of the system, e.g., as will be described in further detail below.

Figure 1:
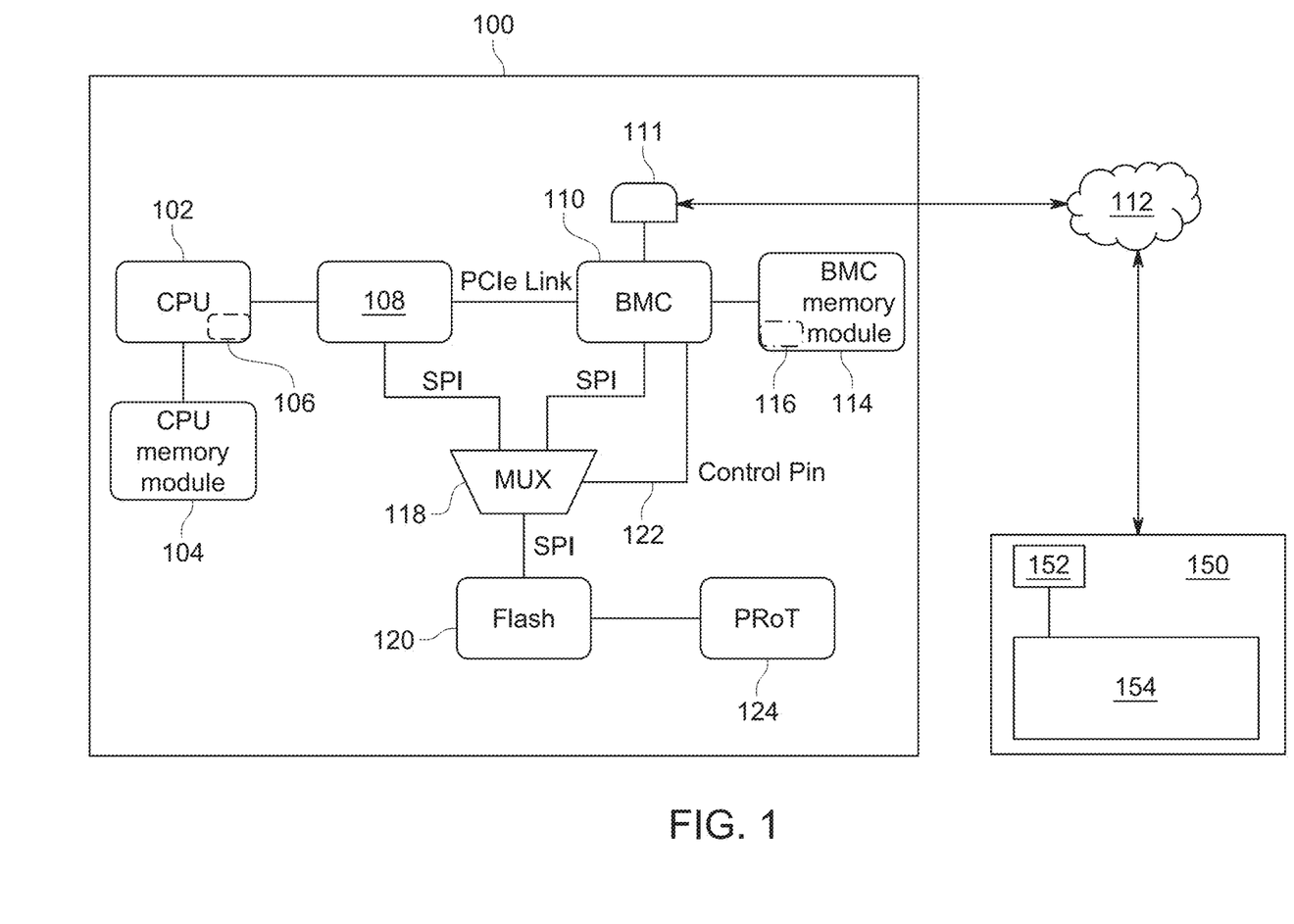
FIG. 1 is a representational view of a compute system, according to certain aspects of the present disclosure.

Looking now to FIG. 1, a compute system 100 is depicted in accordance with one implementation. As an option, the present compute system 100 may be implemented in conjunction with features from any other implementation listed herein, such as those described with reference to the other FIGS. However, such compute system 100 and others presented herein may be used in various applications and/or in permutations which may or may not be specifically described in the illustrative implementations listed herein. Further, the compute system 100 presented herein may be used in any desired environment. Thus FIG. 1 (and the other FIGS.) may be deemed to include any possible permutation.

For instance, the compute system 100 includes a plurality of components therein that are configured in a particular arrangement. However, it should be noted that the configuration illustrated in FIG. 1 is in no way intended to be limiting. For instance, the components may be oriented differently with respect to each other, connected to each other differently, etc. Some implementations may even include fewer components or additional components compared to what is shown.

As shown, a CPU 102 is coupled to a memory module 104. Depending on the implementation, the memory module 104 may include different types of physical memory and/or logical representations of the physical memory. For instance, in some implementations the memory module 104 includes random access memory (RAM). In such implementations, a logical-to-physical table may be used to identify where various data is stored in the RAM and help alternatively include other types of memory, e.g., such as direct access data storage media. For example, the memory module 104 may include hard disks, magnetic tape, etc.

Figure 2A:
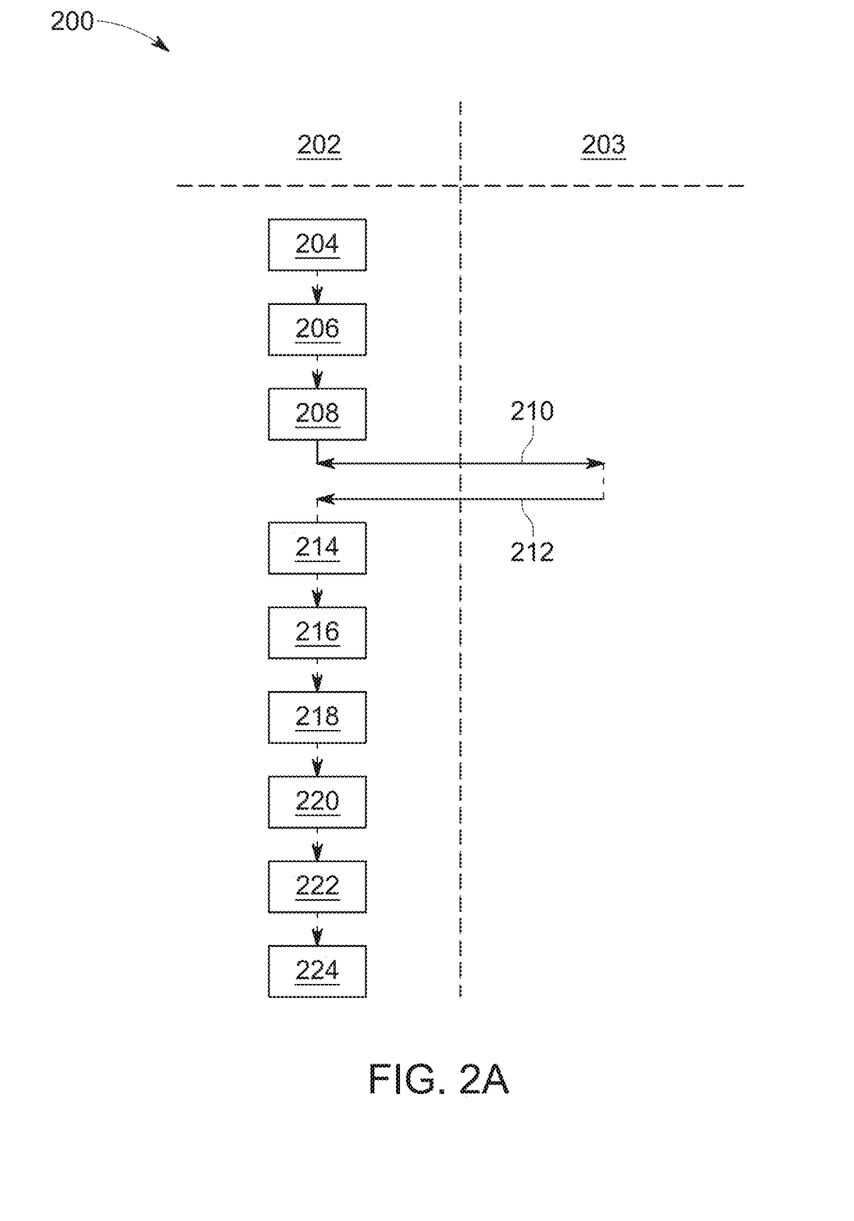
FIG. 2A is a flowchart of an example method for initializing a compute system, according to certain aspects of the present disclosure.

It follows that the CPU 102 is able to communicate with the memory module 104. This allows for information, data, metadata, instructions, commands, requests, files, etc., to be sent between the CPU 102 and the memory module 104. However, the CPU 102 itself may also be able to store data therein. In some implementations, the CPU 102 includes a cache 106 which is able to store information (e.g., data, metadata, instructions, etc.) therein. This information in the cache 106 may be received as part of a startup procedure for the compute system 100 in some implementations (e.g., see operation 212 of method 2A below).

While the cache 106 itself may have a smaller storage capacity compared to other memory in the compute system 100, e.g., such as the memory module 104 or even other memory in the CPU 102, the cache 106 is able to achieve higher levels of performance compared to these other types of memory. For example, the cache 106 is typically able to achieve faster data access times, thereby reducing latency in comparison to even RAM, much less linear access types of memory. It follows that the cache 106 may be used to temporarily store information e.g., such as firmware used during startup of the compute system 100, e.g., as will be described in further detail below.

The CPU 102 is also coupled to a peripheral controller 108. The peripheral controller 108 is thereby able to directly link various information (e.g., signals, data, commands, etc.) to the CPU for data control and access. For instance, the peripheral controller 108 may be used to manage input/output (I/O) operations and present them to the CPU 102. It follows that the peripheral controller 108 may use controller integrated channel circuitry to communicate with the CPU 102 and/or other components that are coupled to the peripheral controller 108. In some implementations, the peripheral controller 108 includes a southbridge module. In other implementations, the peripheral controller 108 includes a northbridge module, both a southbridge module and a northbridge module, other types of chipsets, etc.

The peripheral controller 108 is also connected to a BMC 110. The BMC 110 serves as a specialized processor which may be used to achieve different functionality. For instance, in some implementations the BMC 110 may be used to achieve remote monitoring and management of the compute system 100. According to an example, the BMC 110 may be a specialized service processor that monitors the physical state of components (e.g., hardware devices) in the compute system 100 using sensors and communicating with the system administrator through an independent connection.

As shown, the BMC 110 is coupled to a network connection port 111. The network connection port 111 is able to establish and maintain a connection to a network 112. As a result, the compute system 100 may send and/or receive information (e.g., data, metadata, requests, instructions, commands, etc.) from any location that is also connected to the network 112. For instance, a secondary system 150 having a controller 152 and data storage module 154 is shown as also being connected to the network 112.

It follows that the compute system 100 and secondary system 150 may exchange information therebetween as desired. Depending on the approach, the network connection port 111 may implement physical electrical connections (e.g., wire, cables, buses, etc.) and/or wireless electrical connections (e.g., Wi-Fi, Bluetooth, etc.) to achieve and maintain the connection to the network 112.

While the network 112 is shown as connecting system 100 to secondary system 150 in FIG. 1, it should be noted that the network 112 may be used to connect any desired number of devices (e.g., locations) that are able to connect to the network 112. Moreover, the network 112 itself may be of any desired type. For instance, in some approaches the network 112 is a wide area network (WAN), e.g., such as the Internet. However, an illustrative list of other network types which the network 112 may implement includes, but is not limited to, a local area network (LAN), a public switched telephone network (PSTN), a storage area network (SAN), an internal telephone network, etc. Accordingly, the compute system 100 and the secondary system 150 are able to communicate with each other regardless of the amount of separation which exists therebetween, e.g., despite being positioned at different geographical locations.

The BMC 110 is also connected to a memory module 114. Depending on the implementation, the memory module 114 may include different types of physical memory and/or logical representations of the physical memory. For instance, in some implementations the memory module 114 includes random access memory (RAM). In such implementations, a logical-to-physical table may be used to identify where various data is stored in the RAM and help alternatively include other types of memory, e.g., as described above with respect to memory module 104. It follows that the memory modules 104, 114 may include the same, similar, or different types of memory therein.

The BMC 110 is preferably able to communicate with the memory module 114. This allows for data, metadata, instructions, commands, requests, files, etc., to be sent between the BMC 110 and the memory module 114. At least a portion 116 of the memory module 114 may also be accessible to other components in the compute system 100. In other words, a portion 116 of the memory in the memory module 114 may be read by components in the compute system 100, e.g., such as the CPU 102. This allows for information to be read from the memory module 114 and copied directly to the cache 106 in the CPU 102 and/or the memory module 104.

Depending on the approach, information may be copied from and/or written to the memory module 114 using any processes, subroutines, operations, etc., that would be apparent to one skilled in the art after reading the present description. According to an example, a snapshot of the shared portion 116 of the memory module 114 may be taken and sent to the CPU 102 to update the memory therein. However, the BMC 110 itself may also be able to store data therein. In some implementations, the BMC 110 includes a cache (not shown) which is able to store information (e.g., data, metadata, instructions, etc.) therein.

With continued reference to FIG. 1, the BMC 110 and the peripheral controller 108 are both coupled to a multiplexer 118. The multiplexer 118 may thereby be used to selectively connect one of the peripheral controller 108 and the BMC 110 to a flash memory module 120. In other words, the multiplexer 118 may be used to connect one of (i) the peripheral controller 108, and (ii) the BMC 110, to the flash memory module 120, e.g., as would be appreciated by one skilled in the art after reading the present description. Activation of the multiplexer 118 may be determined by the BMC 110 in some implementations. Accordingly, the control pin 122 is shown as connecting the BMC 110 and multiplexer 118 such that the BMC 110 is able to control whether the peripheral controller 108 or the BMC 110 is connected to the flash memory module 120. However, in other implementations the CPU may additionally or alternatively connected to the multiplexer 118 by a control pin.

Depending on the implementation, the flash memory module 120 may be of any desired size (e.g., have any desired storage capacity) and may be organized (e.g., partitioned) as desired. For example, the flash memory module 120 may have a secure partition of memory that may be logically and/or physically separated from a remainder of memory in the flash memory module 120. The flash memory module 120 may also be configured differently depending on the implementation. For instance, the flash memory module 120 includes serial peripheral interface (SPI) NOR flash memory in some implementations, while in other implementations the flash memory module 120 may include other types of flash, e.g., such as NAND flash memory.

A platform root of trust (PRoT) processor 124 coupled to the flash memory module 120 may be used to scan the secure memory partition and/or other portions of the flash memory module 120. Accordingly, the PRoT processor 124 may be used to validate and confirm at least some of the data, code, firmware, instructions, etc., stored in the flash memory module 120 is not corrupted.

For example, the PRoT processor 124 may be used to validate and confirm BIOS firmware stored in the flash memory module 120 by ensuring the firmware is not corrupted before other components in the compute system 100 are able to access (e.g., execute) the BIOS firmware to begin initialization. In some implementations, the PRoT processor 124 may validate at least a portion of the information stored in the flash memory module 120 in response to the compute system 100 being powered on, e.g., as will soon become apparent.

With continued reference to FIG. 1, it should be noted that the various components in the compute system 100 are preferably connected with a physical electrical connection, e.g., such as a wire, cable, bus, etc. However, wireless connections may be implemented to establish a communication path therebetween in some instances. It follows that while certain types of physical electrical connections may be implemented in the present approach, these are in no way intended to be limiting. In some examples, the peripheral controller 108 and BMC 110 may be connected by a Peripheral Component Interconnect Express (PCIe) link. Each of the peripheral controller 108 and BMC 110 may also be connected to the multiplexer 118 by independent SPI interfaces. As shown, the SPI interface may be a different physical electrical connection compared to the control pin 122. In another example, the multiplexer 118 is connected to the flash memory module 120 by a SPI interface.

By implementing compute systems having the physical configurations described herein and as shown in FIG. 1, the process of initializing the compute systems has been significantly improved. For instance, looking now to FIG. 2A, a flowchart of a computer-implemented method 200 is shown according to one embodiment. The method 200 may be performed in accordance with the present invention in any of the environments depicted in FIG. 1, among others, in various embodiments. Of course, more or less operations than those specifically described in FIG. 2A may be included in the method 200, as would be understood by one of skill in the art upon reading the present descriptions.

Each of the steps of the method 200 may be performed by any suitable component of the operating environment. For example, each of the nodes 202, 203 shown in the flowchart of the method 200 may correspond to one or more processing components positioned at different locations in a compute system. Moreover, each of the one or more components are preferably configured to communicate with each other.

In various embodiments, the method 200 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 200. Illustrative processors include, but are not limited to, a CPU, an application specific integrated circuit (ASIC), a field programmable gate array (FPGA), etc., combinations thereof, or any other suitable computing device known in the art.

As mentioned above, FIG. 2A includes the different nodes 202, 203, each of which represent one or more processors, controllers, computer, etc., positioned at different locations in a compute system. For instance, the node 203 may include a BMC and/or memory connected to the BMC (e.g., see the BMC 110 and/or the BMC memory module 114 of FIG. 1 above). Furthermore, node 202 may include a CPU (e.g., see the CPU 102 of FIG. 1 above). It follows that any components at either of the nodes 202, 203 may be able to communicate with each other. Accordingly, commands, data, requests, etc. may be sent between each of the nodes 202, 203 depending on the approach. Moreover, it should be noted that the various processes included in the method 200 are in no way intended to be limiting, e.g., as would be appreciated by one skilled in the art after reading the present description. For instance, data sent from the node 202 to the node 203 may be prefaced by a request sent from the node 203 to the node 202 in some approaches.

As shown, operation 204 of the method 200 includes receiving an indication that the compute system has been turned on. In other words, operation 204 includes identifying that the compute system has been powered on. While operation 204 is shown as being performed by the node 202, this is in no way intended to be limiting. Any type of indication that the compute system has been turned on may be received at any of the nodes 202, 203 and transmitted to the remaining nodes.

From operation 204, the method 200 proceeds to operation 206 which includes executing an initial portion of BIOS code. Executing the initial portion of BIOS code effectively initiates a startup procedure for a compute system. In some implementations, the initial portion of BIOS code is part of a security phase of a startup procedure. According to an example, which is in no way intended to limit the invention, executing the initial portion of the BIOS code may involve instructing a PRoT processor (e.g., see the PRoT processor 124 of FIG. 1) to validate and confirm BIOS firmware stored at a flash memory module (e.g., see the flash memory module 120 of FIG. 1). The PRoT processor may thereby be able to ensure the BIOS firmware is not corrupted before other components in the compute system are permitted access to begin initialization.

The initial portion may be identified by one or more markers (e.g., flags), stored in a predetermined location in memory, designated by one or more pointers, etc. Moreover, the BIOS code may be executed using any desired processing components located at the node 202.

From operation 206, the method 200 proceeds to operation 208. As shown, operation 208 is performed at the node 202 in the present implementation, however this is in no way intended to be limiting. With respect to the present implementation, operation 208 includes causing a cache to be initialized in a CPU of the compute system. A cache typically includes volatile memory. As a result, a cache typically loses any information stored therein following a loss of power (e.g., following a shutdown procedure).

The process of initializing the cache may differ depending on the implementation. For instance, some implementations involve reading and executing a storage configuration file that allows for the cache to be formed (e.g., allocated). The size of the cache may also be selected during the initialization procedure. As noted above, cache has a high level of performance compared to other types of memory (e.g., such as RAM), but is also more expensive. It follows that, while storage capacity of a cache is limited in some implementations, the cache is preferably large enough to store any desired operational data in addition to BIOS firmware.

Storing at least some of the BIOS firmware locally in the cache of the CPU as described contributes to the improvements achieved herein. For instance, the CPU is able to implement BIOS firmware more quickly and efficiently than other components in the system. Thus, by initializing the CPU cache such that it has sufficient storage capacity to hold operational data as well as BIOS firmware, the efficiency by which a compute system may be initiated is significantly improved, e.g., as will be described in further detail below.

Proceeding to operation 210, a communication path extending between the node 202 and the node 203 is initialized. In preferred approaches, the communication path extends between the CPU and a shared portion of the BMC memory module of the compute system. As a result, the CPU and the BMC are both given access to the shared portion of the BMC memory module. This allows for information (including BIOS firmware) to be copied from the BMC memory module to the CPU for execution. Accordingly, operation 212 includes copying BIOS firmware from the BMC memory module directly to the CPU cache.

The communication path may be configured using any processes which would be apparent to one skilled in the art after reading the present description. For instance, in some approaches, the communication path may be established in response to a handshake procedure between the CPU and BMC memory being satisfied. This communication path desirably allows for the CPU and BMC memory to exchange information (e.g., BIOS firmware) regardless of any other system settings (e.g., a multiplexer status).

As previously mentioned, the CPU cache is able to achieve a high level of performance, particularly in comparison to other components, e.g., such as flash. The BIOS firmware copied to the CPU cache thereby preferably includes portions that may be executed from the CPU cache, e.g., as would be appreciated by one skilled in the art after reading the present description. For instance, in some implementations the BIOS firmware copied from the shared portion of the BMC memory to the CPU cache and/or CPU memory module includes driver execution environment (DXE) foundation code. For instance, causing the BIOS firmware to be initiated from the CPU memory includes calling to a DXE entry point in the DXE foundation code, thereby initiating a DXE phase of initializing the compute system. However, in other approaches the DXE may be copied or transferred from the BMC memory module directly to the CPU memory module (e.g., see sub-operation 242 of FIG. 2B below).

It should be noted that the BIOS firmware stored in the shared portion of the BMC memory module may be directly executed by the CPU without first copying the BIOS firmware to the CPU. As noted above, the communication path provides access to the shared portion of the BMC memory module. However, by copying the BIOS firmware to the CPU, implementations included herein may be implemented even in situations with different kinds of data storage sources which do not support random access. For example, approaches herein may be implemented with NAND Flash.

Additionally, during the process of executing the BIOS firmware to initialize the compute system hardware, the communication path extending between the CPU and BMC shared memory may be unavailable. However, if the BIOS firmware is already copied to CPU cache and executed from the CPU cache directly, the communication path need not be maintained during the entire BIOS execution process. As noted above, this desirably improves performance of the compute system and the efficiency by which it may be initialized.

Referring still to FIG. 2A, operation 214 includes initiating the BIOS firmware from the CPU cache. The process of initiating the BIOS firmware may involve additional and/or preliminary steps in some approaches. For instance, operation 216 includes calling to a pre-EFI initialization (PEI) entry point in the BIOS firmware in the CPU cache. The PEI entry point may be identified using one or more markers (e.g., flags), stored in a predetermined location in memory, designated by one or more pointers, etc. Moreover, the BIOS code may be executed using any desired processing components located at the node 202.

Calling to the PEI entry point in the BIOS firmware effectively ends the security phase of the compute system initialization procedure and initiates a PEI phase of the procedure. Accordingly, operation 218 further includes calling to PEI modules (PEIMs) in the CPU cache. In other words, operation 218 includes communicating with the PEIMs. In preferred approaches, each of the PEIMs are called individually. As a result of calling to the PEIMs, the PEIMs can be used at least in part to initialize a memory controller of the CPU. See operation 220. The process of initializing the memory controller of the CPU allows for memory modules coupled to the CPU to be accessible. For example, a CPU RAM module coupled to the CPU is made available to (e.g., useable by) the CPU as a result of initializing the CPU memory controller. It follows that information may be stored in the CPU RAM module and accessed by the CPU as desired.

Looking now to operation 222, at least a portion of the BIOS firmware is copied from the CPU cache to memory corresponding to the CPU. For example, in some implementations, any portions of the BIOS firmware that has not yet already been executed may be copied to the CPU memory module. As noted above, the BIOS firmware may be copied from the CPU cache to a CPU memory module having RAM in preferred approaches. According to an exemplary approach, instruction codes corresponding to PEI foundation and PEIMs are copied from the CPU cache into the CPU RAM module. This frees at least some of the limited storage capacity in the CPU cache while also allowing for the BIOS firmware to be executed directly by the CPU rather than other components in the overarching compute system, e.g., such as a flash memory module. As noted above, the efficiency at which the BIOS firmware may be executed is thereby significantly improved, particularly in comparison to conventional products.

From operation 222, the method 200 proceeds to operation 224, which includes causing a remainder of the BIOS firmware to be initiated by the CPU memory module. Again, by using the CPU and the CPU memory module to execute BIOS firmware, operational efficiency is significantly improved. This is particularly true in comparison to the performance of conventional products which have suffered from significant latency issues caused by forced system downtime as well as frequent and lengthy update procedures.

Figure 2B:
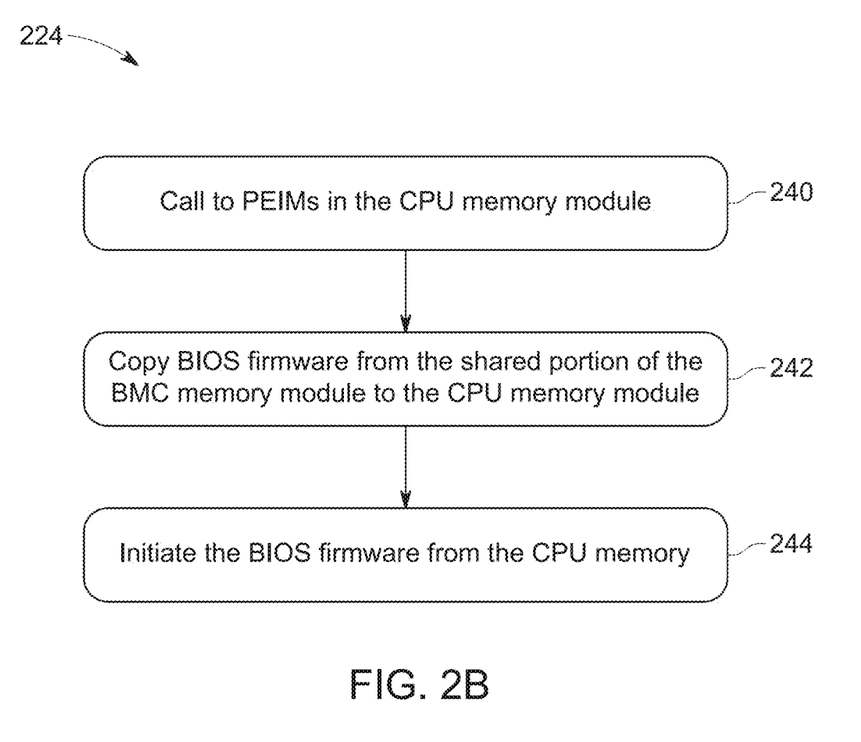
FIG. 2B is a flowchart of sub-operations for one of the operations in the method of FIG. 2A, according to certain aspects of the present disclosure.

As previously mentioned, the process of initiating the BIOS firmware may involve supplemental (e.g., preliminary) steps in some approaches. For instance, a PEI entry point in the BIOS firmware may be used. The PEI entry point may be identified using one or more markers (e.g., flags), stored in a predetermined location in memory, designated by one or more pointers, etc. Referring now to FIG. 2B, exemplary sub-operations of initiating BIOS firmware from a CPU memory module are illustrated in accordance with one embodiment. It follows that one or more of these sub-operations may be used to perform operation 224 of FIG. 2A. Again, by using the CPU and the CPU memory module to execute BIOS firmware, operational efficiency is significantly improved.

However, it should be noted that the sub-processes of FIG. 2B are illustrated in accordance with one embodiment which is in no way intended to limit the invention. For instance, one or more of the sub-operations included in FIG. 2B may be implemented to initiate BIOS firmware at a different location in the compute system. For example, any of the sub-operations included in FIG. 2B may be implemented to initiate the BIOS firmware from the CPU cache (e.g., see operation 214 of FIG. 2A).

Looking to FIG. 2B, the process of initiating BIOS firmware from the CPU memory module includes calling to PEIMs in the CPU memory module. See sub-operation 240. Each of the PEIMs may be a unit of computer code (e.g., logic instructions) that can be called to perform a specific function. Moreover, the PEIMs are called during PEI phase of a startup procedure. In preferred approaches, each of the PEIMs are called individually (e.g., one by one) to complete a given task associated with the PEI phase. For example, each of the PEIMs may be called individually during CPU and/or CPU RAM initialization, e.g., as would be appreciated by one skilled in the art after reading the present description.

Sub-operation 242 further includes copying BIOS firmware from the shared portion of the BMC memory module to the CPU memory module, while sub-operation 244 includes initiating the BIOS firmware from the CPU memory. As noted above, in some implementations BIOS firmware may be copied from the shared portion of the BMC memory module directly to the CPU memory module. The BIOS firmware copied to the CPU memory module may include DXE foundation code. It follows that in such approaches, the BIOS firmware may be initiated from the CPU memory module by calling to a DXE entry point in the DXE foundation code. Calling to the DXE entry point may thereby initiate a DXE phase of initializing the compute system. Moreover, the DXE entry point may be called using any processes which would be apparent to one skilled in the art after reading the present description.

It follows that implementing operations in the method 200 allows for a compute system to be successfully and efficiently initialized. Performance of the compute system itself is also improved following the initialization. For instance, because BIOS firmware is copied from flash to a shared portion of RAM, the likelihood of receiving an update to implement in the flash itself is significantly reduced. This in turn reduces the risk of experiencing a flash error caused by wear on the physical memory components in flash. In comparison, any updates to the BIOS firmware may be implemented directly in RAM much more efficiently than in the flash, e.g., as would be appreciated by one skilled in the art after reading the present description. Additionally, because the amount of information stored in the flash is reduced as a result of this BIOS firmware transfer, any updates to the flash that are performed have a significantly reduced update time in comparison to conventional products.

The process of validating BIOS firmware before implementation is also improved as a result of applying operations in the method 200. As noted above, at least some of the information stored in flash memory may be validated using a PRoT (e.g., see the PRoT processor 124 of FIG. 1). However, by copying a portion of the BIOS firmware to a shared portion of memory that may be accessed by the CPU and/or the BMC, the CPU and/or BMC themselves may be used to perform any desired validation of the BIOS firmware. While the PRoT may be used to perform some validation, copying the BIOS firmware significantly reduces latency for the compute system as a whole, allowing for validation of the BIOS firmware to occur far more quickly than conventionally achievable.

The aforementioned improvements that are achieved as a result of implementing the various implementations included herein are particularly desirable when compared against the shortcomings that have plagued conventional products. For instance, conventional products have experienced significant delays and system downtime resulting from simply updating BIOS firmware. Additionally, failures caused by implementing BIOS firmware using lower-level processing components (e.g., such as flash) reduce efficiency of the compute system as a whole.

It should also be noted that although certain operations and/or sub-operations herein are described as being performed by a particular component at a particular location (e.g., node), this is in no way intended to be limiting. For instance, any of the operations and/or sub-operations may be configured to be performed by the CPU and/or CPU memory module of the compute system (e.g., see the CPU 102 and/or the CPU memory module 104 of FIG. 1). However, in other approaches the operations and/or sub-operations may be configured to be performed by the BMC and/or BMC memory module of the compute system (e.g., see the BMC 110 and/or the BMC memory module 114 of FIG. 1).

Figure 2C:
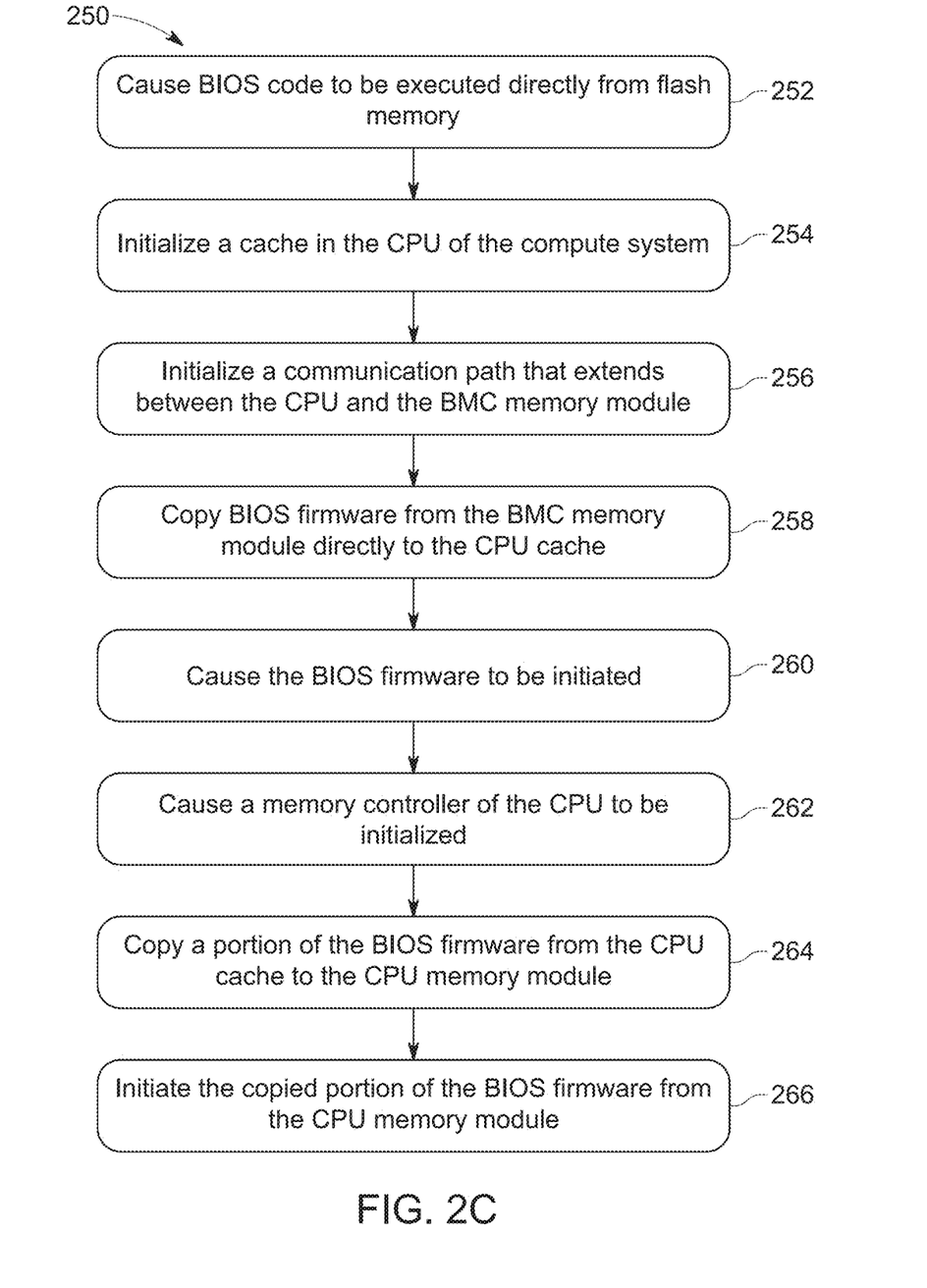
FIG. 2C is a flowchart of an example method for initializing a compute system, according to certain aspects of the present disclosure.

For instance, FIG. 2C illustrates the flowchart of a method 250 for initializing a compute system as implemented by a CPU and/or CPU memory module. The specific operations included in the method 250 are in no way intended to be limiting and may include more or fewer operations depending on the particular implementation.

Operation 252 includes causing BIOS code to be executed directly from flash memory in response to the system being powered on. Moreover, operation 254 includes initializing a cache in the CPU of the compute system, while operation 256 includes initializing a communication path that extends between the CPU and the BMC memory module. As noted above, this communication path preferably extends between a shared portion of the BMC memory module and the CPU cache, but may be implemented differently depending on the approach.

In response to establishing the communication path, BIOS firmware can be copied from the BMC memory module directly to the CPU cache. See operation 258. Moreover, operation 260 includes causing the BIOS firmware to be initiated from the CPU cache. With respect to the present description, it should be noted that in some examples, a flash memory module may not include a processor. Thus, BIOS code stored in the flash memory may actually be executed by processor cores that access the BIOS code from flash memory. In other examples, the BIOS code may be performed by a processor implemented with the flash memory module.

Further still, operation 262 includes causing a memory controller of the CPU to be initialized, thereby making the CPU memory module (e.g., RAM) useable. In response to the CPU memory module being available, operation 264 includes copying a portion of the BIOS firmware from the CPU cache to the CPU memory module. Operation 266 further includes initiating the copied portion of the BIOS firmware from the CPU memory module.

Again, various ones of the implementations are able to significantly improve operational efficiency of the system without limiting performance. This is accomplished at least in part by performing a same number of steps (e.g., operations) in a shorter amount of time than conventionally possible. In other words, implementing approaches included herein will allow for a controller to perform a given number of data operations in a shorter amount of time than conventionally achievable. As noted herein, preferred implementations are able to improve the accessibility of information like BIOS firmware.

In turn, this allows for a compute system to be successfully and efficiently initialized. Performance of the compute system itself is also improved following the initialization. The process of validating BIOS firmware before implementation is also improved as a result of the various approaches herein. Again, these improvements are particularly desirable when compared against the shortcomings that have plagued conventional products. For instance, conventional products have experienced significant delays and system downtime resulting from simply updating BIOS firmware.

While a majority of the BIOS firmware is preferably stored in and implemented from BMC memory and/or CPU memory, some information may remain in flash and/or be implemented differently. For instance, using TianoCore EDK II as an example BIOS design, which is in no way intended to limit the invention, non-BIOS firmware (e.g., such as CPU microcode) which is directly loaded by system hardware like CPU or South Bridge before BIOS execution may remain in flash for at least a part of the initialization procedure. Moreover, the initial BIOS execution phase is directly loaded by the CPU during system reset or in response to power being turned on. In the present example, this initial BIOS execution phase includes SEC phase code. Further still, some regions that are used as non-volatile storage for maintaining some data that may be changed even when BIOS firmware is not updated. For example, BIOS settings and other non-volatile UEFI variables may remain in the flash.

According to an in-use example, which is again in no way intended to limit the invention, a BIOS design with a total BIOS firmware size of 16 MB, may have CPU microcode(s) that occupy about 1 MB, SEC phase code (e.g., the initial BIOS firmware) may be about 32 KB, and the non-volatile region for keeping data occupies about 512 KB. All other BIOS information (e.g., firmware, code, etc.) can be copied into the shared portion of BMC memory module, as described in the various implementations herein.

It follows that not only do implementations included herein reduce data access times, but they also reduce the number of steps that are performed while initializing a compute system. As a result, compute systems perform less computational work while also being able to increase operational throughput in parallel.

It should also be noted that the various implementations herein may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It follows that although various aspects of the implementations herein have been illustrated as including specific designs, orientations, numbers of components, etc., this is in no way intended to limit the invention. Rather, the implementations herein are presented for exemplary purposes only and may vary in design, orientation, number of components, etc., depending on the desired approach. It should also be noted that use of the terms "bottom", "lower", "top", "upper", etc., are in no way intended to be limiting. Any frames of reference used to describe the various implementations herein have been selected for illustrative purposes only and may be adjusted as desired.

It should also be noted that, while the disclosed implementations have been illustrated and described with respect to one or more approaches, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

It should also be understood that various implementations of the present disclosure have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A computer-implemented method for initializing a compute system, the computer-implemented method comprising:
    in response to basic input/output system (BIOS) code being executed directly from flash memory, causing a cache to be initialized in a central processing unit (CPU) of the compute system;
    causing a communication path to be initialized, the communication path extending between the CPU and memory corresponding to a baseboard management controller (BMC) of the compute system;
    causing BIOS firmware to be copied from the BMC memory to the CPU cache;
    causing the BIOS firmware to be initiated from the CPU cache;
    causing a memory controller of the CPU to be initialized;
    causing a portion of the BIOS firmware to be copied from the CPU cache to memory corresponding to the CPU; and
    causing the portion of the BIOS firmware to be initiated from the CPU memory.

2. The computer-implemented method of claim 1, wherein causing the BIOS firmware to be initiated from the CPU cache includes calling to a pre-EFI initialization (PEI) entry point in the BIOS firmware in the CPU cache, thereby initiating a PEI phase of initializing the compute system.

3. The computer-implemented method of claim 2, further comprising calling to PEI modules (PEIMs) in the CPU cache, wherein the PEIMs are used to initialize the memory controller of the CPU.

4. The computer-implemented method of claim 1, wherein the BMC memory includes random access memory (RAM).

5. The computer-implemented method of claim 1, wherein the communication path extends between the CPU and a shared portion of the BMC memory, the shared portion of the BMC memory being accessible to the CPU and the BMC.

6. The computer-implemented method of claim 1, further comprising:
   calling to pre-EFI initialization modules (PEIMs) in the CPU memory;
   causing BIOS firmware to be copied from the BMC memory to the CPU memory; and
   causing the BIOS firmware to be initiated from the CPU memory.

7. The computer-implemented method of claim 6, wherein the BIOS firmware copied from the BMC memory to the CPU memory includes driver execution environment (DXE) foundation code, wherein causing the BIOS firmware to be initiated from the CPU memory includes calling to a DXE entry point in the DXE foundation code, thereby initiating a DXE phase of initializing the compute system.

8. The computer-implemented method of claim 1, wherein the flash memory includes serial peripheral interface NOR flash memory.

9. A computer program product for initializing a compute system, the computer program product comprising a computer readable storage medium having program instructions embodied therewith, the program instructions readable and/or executable by a processor to cause the processor to:
   in response to basic input/output system (BIOS) code being executed directly from flash memory, cause, by the processor, a cache to be initialized in a central processing unit (CPU) of the compute system;
   cause, by the processor, a communication path to be initialized, the communication path extending between the CPU and memory corresponding to a baseboard management controller (BMC) of the compute system;
   cause, by the processor, BIOS firmware to be copied from the BMC memory to the CPU cache;
   cause, by the processor, the BIOS firmware to be initiated from the CPU cache;
   causing a memory controller of the CPU to be initialized;
   cause, by the processor, a portion of the BIOS firmware to be copied from the CPU cache to memory corresponding to the CPU; and
   cause, by the processor, the portion of the BIOS firmware to be initiated from the CPU memory.

10. The computer program product of claim 9, wherein causing the BIOS firmware to be initiated from the CPU cache includes calling to a pre-EFI initialization (PEI) entry point in the BIOS firmware in the CPU cache, thereby initiating a PEI phase of initializing the compute system.

11. The computer program product of claim 10, wherein the program instructions are further readable and/or executable by the processor to cause the processor to call, by the processor, to PEI modules (PEIMs) in the CPU cache, wherein the PEIMs are used to initialize the memory controller of the CPU.

12. The computer program product of claim 9, wherein the BMC memory includes random access memory (RAM).

13. The computer program product of claim 9, wherein the communication path extends between the CPU and a shared portion of the BMC memory, the shared portion of the BMC memory being accessible to the CPU and the BMC.

14. The computer program product of claim 9, wherein the program instructions are further readable and/or executable by the processor to cause the processor to:
   call, by the processor, to pre-EFI initialization modules (PEIMs) in the CPU memory;
   cause, by the processor, BIOS firmware to be copied from the BMC memory to the CPU memory; and
   cause, by the processor, the BIOS firmware to be initiated from the CPU memory.

15. The computer program product of claim 14, wherein the BIOS firmware copied from the BMC memory to the CPU memory includes driver execution environment (DXE) foundation code, wherein causing the BIOS firmware to be initiated from the CPU memory includes calling to a DXE entry point in the DXE foundation code, thereby initiating a DXE phase of initializing the compute system.

16. The computer program product of claim 9, wherein the flash memory includes serial peripheral interface NOR flash memory.

17. A compute system, comprising:
   flash memory;
   a central processing unit (CPU);
   a baseboard management controller (BMC);
   a processor; and
   logic integrated with and/or executable by the processor, the logic being configured to:
   in response to basic input/output system (BIOS) code being executed directly from the flash memory, cause, by the processor, a cache to be initialized in the CPU;
   cause, by the processor, a communication path to be initialized, the communication path extending between the CPU and memory corresponding to the BMC;
   cause, by the processor, BIOS firmware to be copied from the BMC memory to the CPU cache;
   cause, by the processor, the BIOS firmware to be initiated from the CPU cache;
   causing a memory controller of the CPU to be initialized;
   cause, by the processor, a portion of the BIOS firmware to be copied from the CPU cache to memory corresponding to the CPU; and
   cause, by the processor, the portion of the BIOS firmware to be initiated from the CPU memory.

18. The compute system of claim 17, wherein the logic is further configured to:
   call, by the processor, to pre-EFI initialization modules (PEIMs) in the CPU memory;
   cause, by the processor, BIOS firmware to be copied from the BMC memory to the CPU memory; and
   cause, by the processor, the BIOS firmware to be initiated from the CPU memory.

19. The compute system of claim 18, wherein the BIOS firmware copied from the BMC memory to the CPU memory includes driver execution environment (DXE) foundation code, wherein causing the BIOS firmware to be initiated from the CPU memory includes calling to a DXE entry point in the DXE foundation code, thereby initiating a DXE phase of initializing the compute system.

20. The compute system of claim 17, wherein the flash memory is separated from the CPU and BMC by a multiplexer, wherein the communication path extends between the CPU and a shared portion of the BMC memory, the shared portion of the BMC memory being accessible to the CPU and the BMC.

\* \* \* \* \*